United States Patent [19]
Goto et al.

[11] Patent Number: 5,651,260
[45] Date of Patent: Jul. 29, 1997

[54] CONTROL APPARATUS AND METHOD FOR ACTUATING AN ELECTRICALLY DRIVEN COMPRESSOR USED IN AN AIR CONDITIONING SYSTEM OF AN AUTOMOTIVE VEHICLE

[75] Inventors: Naomi Goto, Shiga-ken; Makoto Yoshida, Kusatsu, both of Japan

[73] Assignee: Matsushita Electric Industrial Co., Ltd., Japan

[21] Appl. No.: 605,272

[22] Filed: Feb. 6, 1996

[30] Foreign Application Priority Data

Feb. 9, 1995 [JP] Japan .................................. 7-021894

[51] Int. Cl.$^6$ ........................................... F25B 49/02
[52] U.S. Cl. .......................... 62/126; 62/228.4; 62/259.2; 165/80.4
[58] Field of Search .......................... 62/126, 125, 127, 62/129, 259.2, 244, 208, 209, 161, 228.1, 228.4, 228.5, 230; 165/80.2, 80.3, 80.4, 104.33; 257/721, 722, 714; 361/690, 694, 695, 720, 722, 699, 717

[56] References Cited

U.S. PATENT DOCUMENTS

| | | |
|---|---|---|
| 4,720,981 | 1/1988 | Helt et al. ........................ 62/228.4 X |
| 5,481,433 | 1/1996 | Carter ............................... 165/80.3 X |
| 5,493,868 | 2/1996 | Kikuiri et al. ...................... 62/129 |

Primary Examiner—Harry B. Tanner
Attorney, Agent, or Firm—Rossi & Associates

[57] ABSTRACT

A micro computer 6 reads a manual switch signal Sm from an operating section 15, and sets a target output W0 of an electrically driven compressor 11 based on the manual switch signal Sm. A temperature sensor 20 detects a temperature Ts of a designated component in the compressor control system. Micro computer 6 judges whether the detected temperature Ts is larger than a predetermined upper limit Ta, and generates an output command W equalized to the target output W0 when the temperature Ts is within a predetermined allowable range. On the other hand, when the detected temperature Ts is higher than the upper limit Ta, micro computer 6 sets a modified output W1 smaller than target output W0 by a predetermined correction value ΔW (W1=W0−ΔW>0), and adjusts the output command W to the modified output W1. Then, the compressor 11 is actuated based on thus obtained output command W.

14 Claims, 13 Drawing Sheets

CONTROL APPARATUS AND METHOD FOR ACTUATING AN ELECTRICALLY DRIVEN COMPRESSOR USED IN AN AIR CONDITIONING SYSTEM OF AN AUTOMOTIVE VEHICLE

BACKGROUND OF THE INVENTION

1. Field of the Invention

The present invention generally relates to a control apparatus and a method for actuating an electrically driven compressor used in an air conditioning system of an automotive vehicle, which is capable of promptly and adequately adjusting the output of the compressor in response to a detected increase of the inside or peripheral temperature of the control system, thereby stabilizing the operation of the compressor and assuring reliability of the air conditioning system.

2. Prior Art

A control system of an electric compressor is generally subjected to heat generation due to power consumption when it actuates the compressor. For example, an electrically driven compressor, when it has an output of 2 KW, will cause a heat generation of approximately 40 W which corresponds to 2% of the overall output. Various electronic components inside the control system are sensitive to heat; thus, it is essentially important to protect these electronic components for guaranteeing the performance of the control system. To this end, the control system is generally provided with a heat radiation device of normally an air-cooling type or a water-cooling type. Specifications of the heat radiation device needs to be designed based on the heat radiation conditions including ambient or peripheral temperatures and electric power consumption.

Furthermore, in the event of unusual increase of temperature, some of electrically driven compressor can be automatically stopped to prevent any damage from occurring by such excessive heat generations.

According to the above-described conventional systems, when the temperature of the control system is extraordinarily increased, the only effective countermeasure is to stop the electric compressor; otherwise, the control system of the electric compressor will be fatally damaged.

However, in view of the driving safety, sudden stop or malfunction of an air conditioning system in an automotive vehicle is not desirable and recommendable. For example, sudden stop of the air conditioning system will make it impossible to keep a clean view through the front windshield glass since the glass will be clouded up with moisture. Furthermore, a drive or passenger may be surprised or frightened by the sudden stop of blow air. Needless to say, such sudden stop or malfunction will make passengers feel uncomfortable.

Still further, it is essentially important to assure a long life of the control system of each electric compressor. In this respect, an electrolytic capacitor, which essentially determines the life of the electric compressor control system since its life is significantly short, needs to be kept safely so as not to suffer from increase of temperature.

SUMMARY OF THE INVENTION

In view of the above-described problems encountered in the prior art, the present invention has a principal object to provide a control apparatus and a method for actuating an electric compressor used in an air conditioning system, which is capable of promptly and adequately suppressing the output of the compressor in response to a detected increase of the inside or peripheral temperature of the control system, thereby stabilizing the operation of the compressor and assuring reliability of the air conditioning system for an automotive vehicle.

To accomplish above and other related objects, a first aspect of the present invention provides a control apparatus for actuating an electrically driven compressor equipped in an automotive vehicle, comprising: a temperature sensor generating a signal representing a temperature of a component in the control apparatus; and control means connected to the temperature sensor for adjusting an output command supplied to the electrically driven compressor in accordance with the signal generated from the temperature sensor.

According to features of the preferred embodiments, the temperature sensor detects a temperature of any one of a heat radiator such as a heat sink, a micro computer or like processing unit, a relay, a (switching) power unit, and an electrolytic capacitor substantially determining the life of the control system.

In addition, it is possible to provide an alarm indicator generating an alarm Whenever the temperature detected by the temperature sensor goes out of a predetermined allowable range.

Furthermore, a second aspect of the present invention provides a control apparatus for actuating an electrically driven compressor equipped in an automotive vehicle, characterized by manual switch means, command generating means, drive means, temperature sensing means, and adjusting means.

According to the second aspect compressor control apparatus, the manual switch means allows a use to adjust an output of the compressor and generates a request signal representing a quantity of user's manual adjustment. The command generating means receives the request signal and generates an output command supplied to the compressor in accordance with the quantity of manual adjustment.

The drive means actuates the compressor based on the output command. The temperature sensing means generates a temperature signal representing a temperature of a component in the control apparatus. And the adjusting means receives the temperature signal from the temperature sensing means and generates a modified output command, when the temperature detected by the temperature sensing means exceeds a predetermined upper-limit value. In this case, the modified output command is smaller than the output command but larger than 0.

Still further, a third aspect of the present invention provides a control apparatus for actuating an electrically driven compressor equipped in an automotive vehicle, characterized by manual switch means, target output means, temperature sensing means, modified output means, command generating means, and drive means.

According to the third aspect compressor control apparatus, the manual switch means allows a use to adjust an output of the compressor and generates a request signal representing a quantity of user's manual adjustment. The target output means receives the request signal from the manual switch means and obtains a target output of the compressor. In this case, the target output is proportional to the quantity of user's manual adjustment.

The temperature sensing means generates a temperature signal representing a temperature of a component in the control apparatus. The modified output means receives the temperature signal from the temperature sensing means, and obtains a modified output when the temperature detected by the temperature sensing means exceeds a predetermined upper limit. The modified output is set smaller than the target output obtained by the target output means but larger than 0.

The command generating means generates an output command supplied to the compressor in such a manner that the output command is equalized to the target output when the temperature detected by the temperature sensing means is within a predetermined allowable range while the output command is equalized to the modified output when the temperature detected by the temperature sensing means exceeds the upper limit. And, the drive means actuates the compressor based on the output command generated from the command generating means.

Yet further, a fourth aspect of the present invention provides a control apparatus for actuating an electrically driven compressor equipped in an automotive vehicle, characterized by manual switch means, target output means, temperature sensing means, modified output means, emergency means, command generating means, and drive means.

According to the fourth aspect compressor control apparatus, the manual switch means allows a use to adjust an output of the compressor and generates a request signal representing a quantity of user's manual adjustment. The target output means receives the request signal from the manual switch means and obtains a target output of the compressor, which is proportional to the quantity of user's manual adjustment.

The temperature sensing means generates a temperature signal representing a temperature of a component in the control apparatus. The modified output means receives the temperature signal from the temperature sensing means, and obtains a modified output when the temperature detected by the temperature sensing means exceeds a predetermined upper limit.

The modified output is set smaller than the target output obtained by the target output means but larger than 0.

The emergency means receives the temperature signal from the temperature sensing means, and forcibly stops the compressor when the temperature detected by the temperature sensing means exceeds a predetermined critical value higher than the upper limit.

The command generating means generates an output command supplied to the compressor in such a manner that the output command is equalized to the target output when the temperature detected by the temperature sensing means is within a predetermined allowable range while the output command is equalized to the modified output when the temperature detected by the temperature sensing means is higher than the upper limit but lower than the critical value.

And, the drive means actuates the compressor based on the output command generated from the command generating means.

Moreover, the present invention provides the method for actuating the electrically driven compressor of an air conditioning system installed in an automotive vehicle.

More specifically, a fifth aspect of the present invention provides a control method for actuating an electrically driven compressor equipped in an automotive vehicle, comprising the following first to sixth steps.

A first step is to read a request signal representing a quantity of user's manual adjustment. A second step is to set a target output of the compressor based on the request signal. A third step is to detect a temperature of a component in the control apparatus. A fourth step is to judge whether the temperature is larger than a predetermined upper limit.

A fifth step is to obtain an output command in such a manner that the output command is equalized to the target output when the temperature is within a predetermined allowable range while the output command is reduced to a modified value larger than 0 when the temperature exceeds the upper limit. And, a sixth step is to actuate the compressor based on the output command.

Furthermore, a sixth aspect of the present invention provides a control method for actuating an electrically driven compressor equipped in an automotive vehicle, characterized by the following first to eighth steps.

A first step is to read a request signal representing a quantity of user's manual adjustment. A second step is to set a target output of the compressor based on the request signal. In this case, the target output is proportional to the quantity of user's manual adjustment.

A third step is to detect a temperature of a component in the control apparatus. A fourth step is to judge whether the temperature is larger than a predetermined upper limit. A fifth step is to generate an output command equalized to the target output, when the temperature is within a predetermined allowable range.

A sixth step is to set a modified output by reducing the target output by a predetermined correction value. The modified output is smaller than the target output but larger than 0. A seventh step is to generate an output command equalized to the modified output, when the temperature exceeds the upper limit. And, an eighth step is to actuate the compressor based on the output command.

Still further, a seventh aspect of the present invention provides a control method for actuating an electrically driven compressor equipped in an automotive vehicle, characterized by the following first to tenth steps.

A first step is to read a request signal representing a quantity of user's manual adjustment. A second step is to set a target output of the compressor based on the request signal, so that the target output is proportional to the quantity of user's manual adjustment. A third step is to detect a temperature of a component in the control apparatus.

A fourth step is to judge whether the temperature is larger than a predetermined critical value. A fifth step is to stop the compressor when the temperature exceeds the critical value, regardless of the quantity of user's manual adjustment.

A sixth step is to judge whether the temperature is larger than a predetermined upper limit. In this case, the upper limit is lower than the critical value. A seventh step is to generate an output command equalized to the target output when the temperature is within a predetermined allowable range. An eight step is to set a modified output by reducing the target output by a predetermined correction value. The modified output is smaller than the target output but larger than 0. A ninth step is to generate an output command equalized to the modified output when the temperature is higher than the upper limit but lower than the critical value. And, a tenth step is to actuate the compressor based on the output command.

According to features of the preferred embodiment, it is desirable to provide the following steps.

an eleventh step is to judge whether the temperature is larger than a Predetermined reference value. The reference value is set lower than the upper limit. And, a twelfth step is to restore the output command to the target output when the temperature falls below the reference value.

Thus, according to the present invention, it becomes possible to promptly and adequately suppress the output of the compressor in response to a detected increase of the inside or peripheral temperature of the control system, thereby stabilizing the operation of the compressor and assuring reliability of the air conditioning system for an automotive vehicle.

BRIEF DESCRIPTION OF THE DRAWINGS

The above and other objects, features and advantages of the present invention will become more apparent from the following detailed description which is to be read in conjunction with the accompanying drawings, in which.

DETAILED DESCRIPTION OF THE PREFERRED EMBODIMENTS

Figure 1:
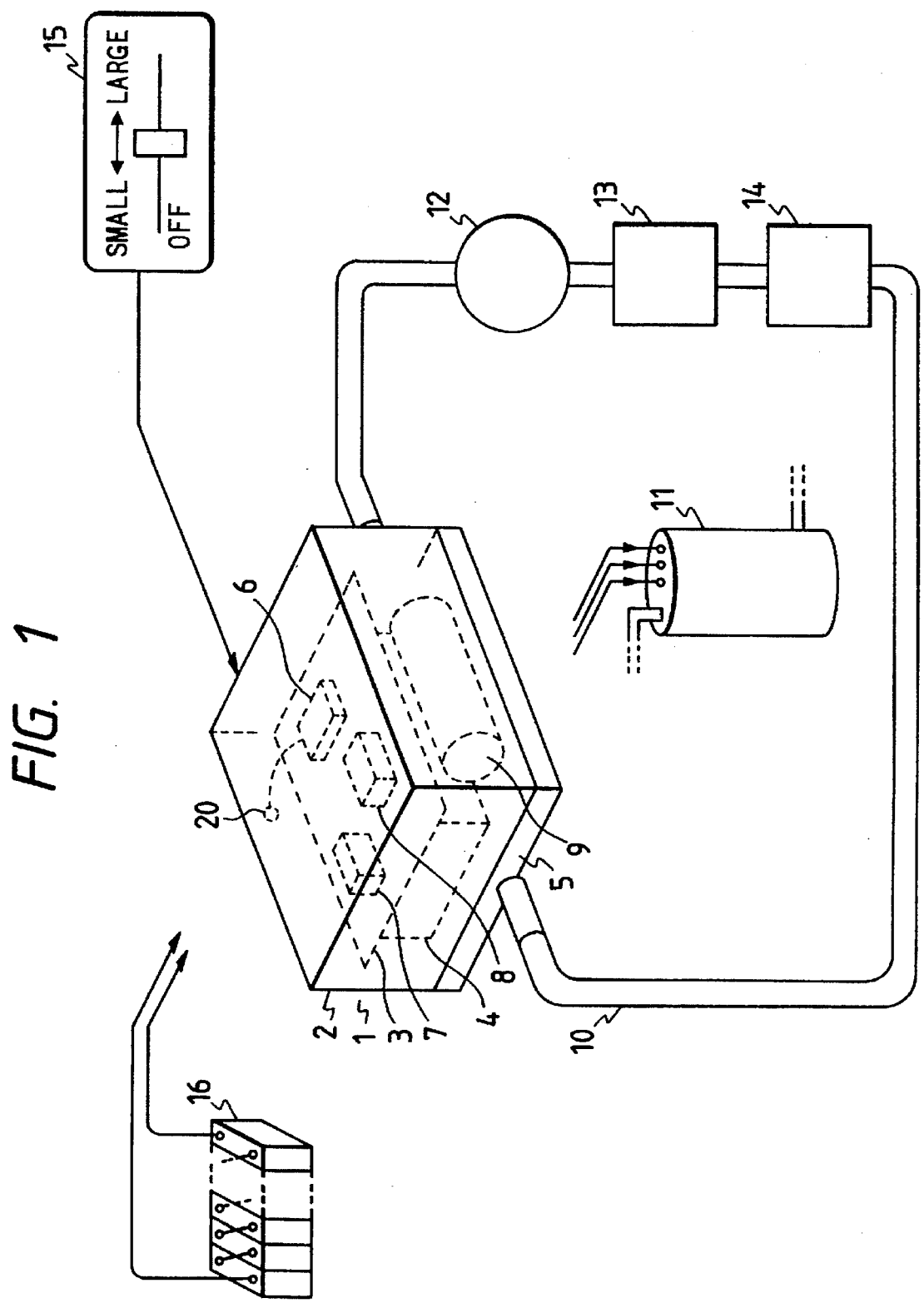
FIG. 1 is a view showing a schematic arrangement of a control system for an electrically driven compressor in accordance with a first embodiment of the present invention.

Preferred embodiments of the present invention will be explained in greater detail hereinafter, with reference to the accompanying drawings. Identical parts are denoted by identical reference numerals throughout the views.

Figure 3:
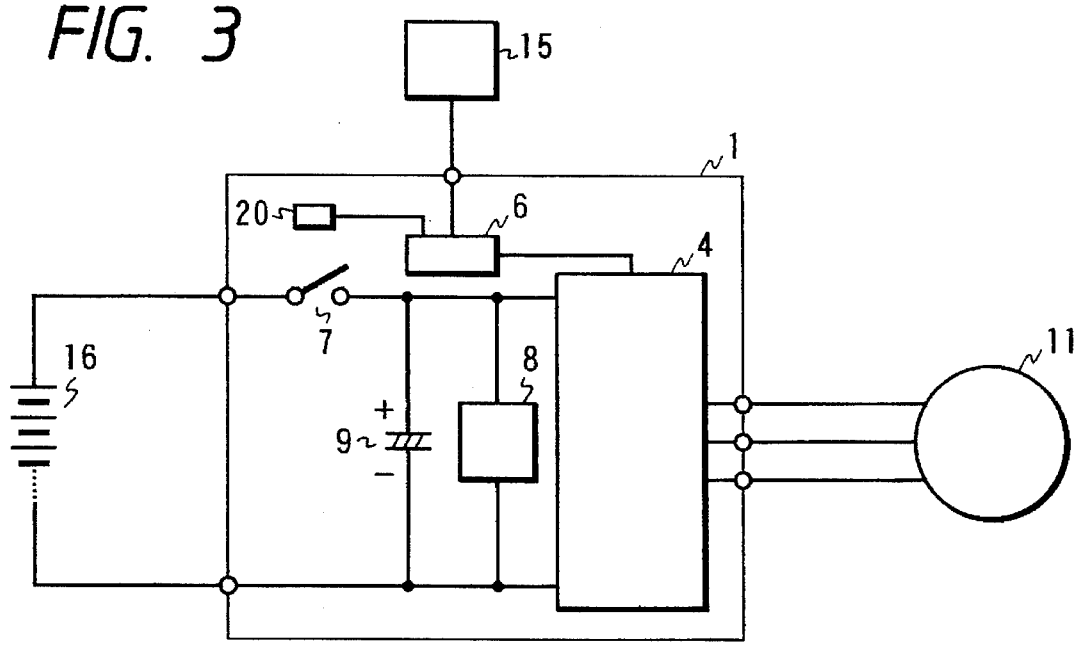
FIG. 3 is a circuit block diagram showing the control system for the electrically driven compressor in accordance with the present invention.

FIG. 3 shows a circuit arrangement of the control system of an electrically driven compressor in accordance with the present invention.

A control unit 1, connected to a battery 16, receives DC (direct-current) power from battery 16. The control unit 1 comprises a drive power output section 4, a micro computer 6, a relay 7, a switching power unit 8, an electrolytic capacitor 9, and a temperature sensor 20. The drive power output section 4 converts the supplied DC power into AC (alternating-current) form and supplies thus converted AC power to an electrically driven compressor 11 connected to control unit 1.

The switching power unit 8 converts the voltage of battery 16 into a voltage required in the drive power output section 4. The electrolytic capacitor 9, connected in parallel to switching power unit 8, absorbs current and voltage ripples when the drive power output section 4 converts the voltage of battery 16 into AC form. The relay 7 opens or closes the power supplying circuit connecting battery 16 and drive power output section 4.

The micro computer 6 controls the power conversion performed in the drive power output section 4 in response to the quantity of a user's manual adjustment entered through an operating section 15. The operating section 15, connected to the control unit 1 via a signal line such as harness, is usually disposed on the instrument panel in a passenger compartment of an automotive vehicle.

The micro computer 6 further receives a detection signal from the temperature sensor 20 to adjust the power conversion performed in the drive power output section 4 in response to the detected sensor temperature.

Thus, the micro computer 6 drives a motor of compressor 11 in accordance with not only the user's request (i.e. quantity of user's manual adjustment) but also the detected sensor temperature. In the driving operation of compressor 11, electric power is chiefly consumed in the drive power output section 4.

FIG. 1 shows a schematic arrangement of the control system for an electrically driven compressor in accordance with a first embodiment of the present invention. The control unit 1 comprises a printed circuit board 3 on which micro computer 6, relay 7 and switching power unit 8 are mounted. The micro computer 6 is connected to the temperature sensor 20 (through a conductive path on the printed circuit board 3). The temperature sensor 20 is disposed inside the housing 2 of control unit 1.

The drive power output section 4 is located under the printed circuit board 3 and brought into direct contact with a heat sink 5 at the bottom thereof. The heat sink 5, serving as a water-cooling type radiator, receives cooling water forcibly circulated by a pump 12 through a hose 10. A water cooling unit 13, disposed in series and upstream of pump 12, is connected to pump 12 through hose 10, in order to cool down the circulated hot water before it is sucked up by pump 12. A unit disposed upstream of water cooling unit 13 is a heat generator 14 serving as a heat generating source other than control unit 1.

Housing 2 and heat sink 5 are integrally united as a single package accommodating the control unit 1.

The operating section 15 has a knob slidable in a right and left direction. Users can manipulate this knob to adjust the output of compressor 11. Harness outgoing to compressor 11 or entering from battery 16 or operating section respectively passes through the wall of housing 2 and connected to the printed circuit board 3, although not shown in the drawings.

FIGS. 2A through 2D show the correlations among various factors, such as temperature, output, power consumption, and cooling ability, in the electric compressor control system.

Figure 2A:
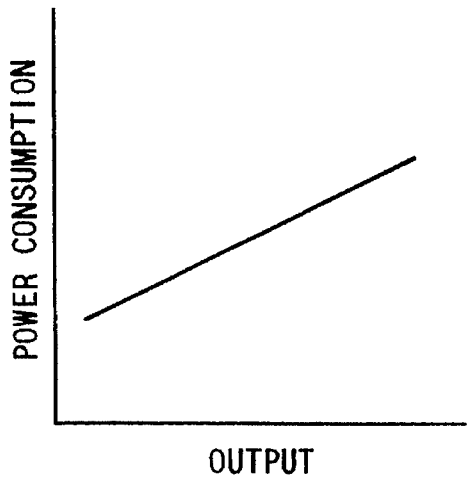
FIGS. 2A through 2D are views showing the correlations among temperature, output, power consumption, and cooling ability in the electric compressor control system.
Figure 2B:
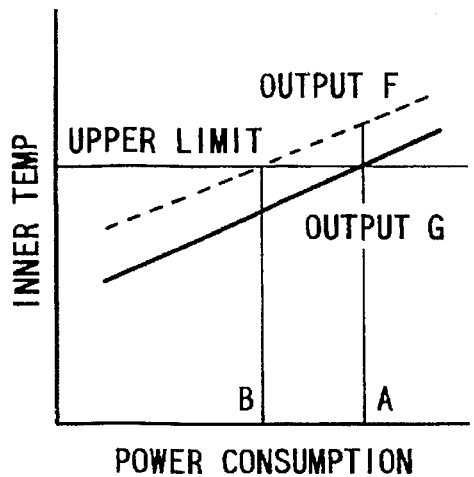
Figure 2C:
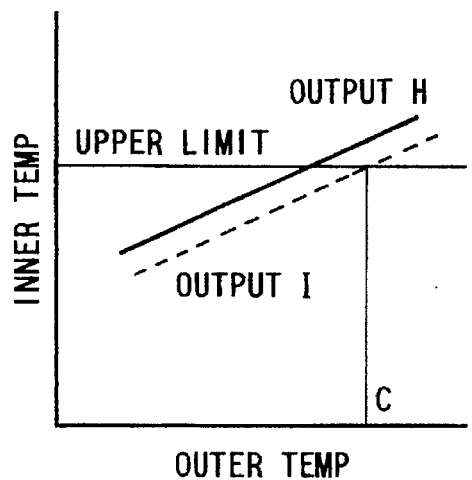
Figure 2D:
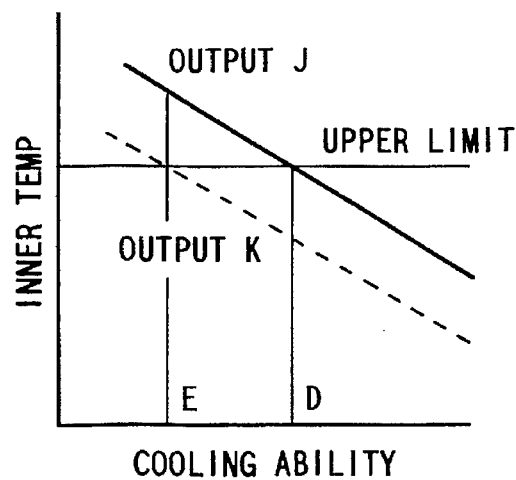

As illustrated in FIG. 2A, the electric power consumption increases with increasing output. As illustrated in FIG. 2B, the heat generation inside the control unit 1, i.e. inner temperature, is increased in proportion to the increase of the electric power consumption. As illustrated in FIG. 2C, the inner temperature increases with increasing outer temperature (temperature outside the control unit 1). Furthermore, as illustrated in FIG. 2D, the inner temperature is reduced with increasing cooling ability.

It is now assumed that pump 12 is out of order, and the water circulation amount is so reduced that the cooling ability is lowered from "D" to "E". In this case, the inner temperature will exceed the predetermined upper limit if the compressor 11 is driven at the output J. The inner temperature is detected by temperature sensor 20 and sent to micro computer 6. In response to the detection of such an excessive increase of inner temperature, micro computer 6 adjusts the power conversion performed by the drive power output section 4 so as to reduce the output of compressor 11 to the level of output K where the inner temperature is equal to the predetermined upper limit.

According to the correlation shown in FIG. 2C, an upper limit of an outer temperature corresponding to the upper limit of the inner temperature can be identified in a one-to-one manner when the output of the compressor 11 is known. For example, when the outer temperature is "C", the corresponding inner temperature will exceeds the upper limit when the compressor 11 is driven at the output H, but will be identical with the upper limit when the compressor 11 is driven at the output I. Thus, measuring an outer temperature makes it possible to indirectly detect the corresponding inner temperature.

Furthermore, according to the correlation shown in FIG. 2B, when the electric power consumption is increased from "B" to "A", the inner temperature will exceed the upper limit if the compressor 11 is driven at the output F. Hence, the output of compressor 11 needs to be reduced to the level of output G where the inner temperature is identical with the upper limit.

Next, an operation of the present invention will be explained with reference to FIG. 4 which shows a control routine performed by the control system for actuating the compressor in accordance with the present invention.

First, in step S1, micro computer 6 reads a manual switch signal Sm from the operating section 15, since the manual switch signal Sm represents a user's request entered through manipulation of the slidable knob provided on the operating section 15.

Next, in step S2, micro computer 6 makes a judgement as to whether the switch knob is in an OFF position. If the judgement is "YES" in step S2, this control routine is ceased at this moment. On the other hand, if the user sets the switch knob somewhere other than the OFF position (i.e. "NO" in step S2), the control routine proceeds to step S3 wherein a target output W0 of compressor 11 is determined based on the manipulation volume of the knob slidable on the operating section 15. The target output W0 is proportional to the user's request.

Next, in step S4, micro computer 6 reads a sensor temperature Ts detected by temperature sensor 20. Then, it is judged in step S5 whether the sensor temperature Ts is larger than a predetermined critical temperature Tb. When the sensor temperature Ts exceeds the critical temperature Tb, the control routine proceeds to step S6 to set the output command W to 0 (W=0) and send this command to the compressor thereby forcibly stopping the compressor 11.

The critical temperature Tb is a fairly high temperature that possibly causes the fatal damage unavoidable without shutdown of the electric compressor control system.

When the sensor temperature Ts is not larger than the critical temperature Tb, the control routine proceeds to step S7 to further make a judgement as to whether the sensor temperature Ts is larger than a predetermined upper-limit temperature Ta.

When the sensor temperature Ts is not larger than the upper-limit temperature Ta, the control routine proceeds to step S8 to set the output command W to the target output W0 obtained in step S3 (W=W0) and send this command to the compressor 11, thereby driving the compressor 11 in direct proportion to the user's request. In other words, the temperature Ta forms the reference or criterion point for judging whether the compressor 11 should be driven as requested by the user.

After completing step S8, the control routine returns to step S1 to repeat the above-described processing.

On the other hand, when the sensor temperature Ts is larger than the upper-limit temperature Ta ("YES" in step S7), micro computer 6 proceeds to step S9 to set a modified output W1 which is smaller than the target output W0 by $\Delta W$, i.e. $W1=W0-\Delta W$ (>0). Subsequently, in step S10, micro computer 6 sets the output command W to the modified output W1 (W=W1) and sends this command to the compressor 11, thereby driving the compressor 11 at a slightly smaller output compared with the user's request.

In other words, the sensor temperature Ts is higher than the allowable upper-limit temperature Ta but less than the critical temperature Ta in this case; therefore, the micro computer 6 basically continues to drive compressor 11 although the output command W is set lower than the user's request.

After completing step S10, the control routine returns to step S4 to repeat the processing of step S4 and below.

Figure 5:
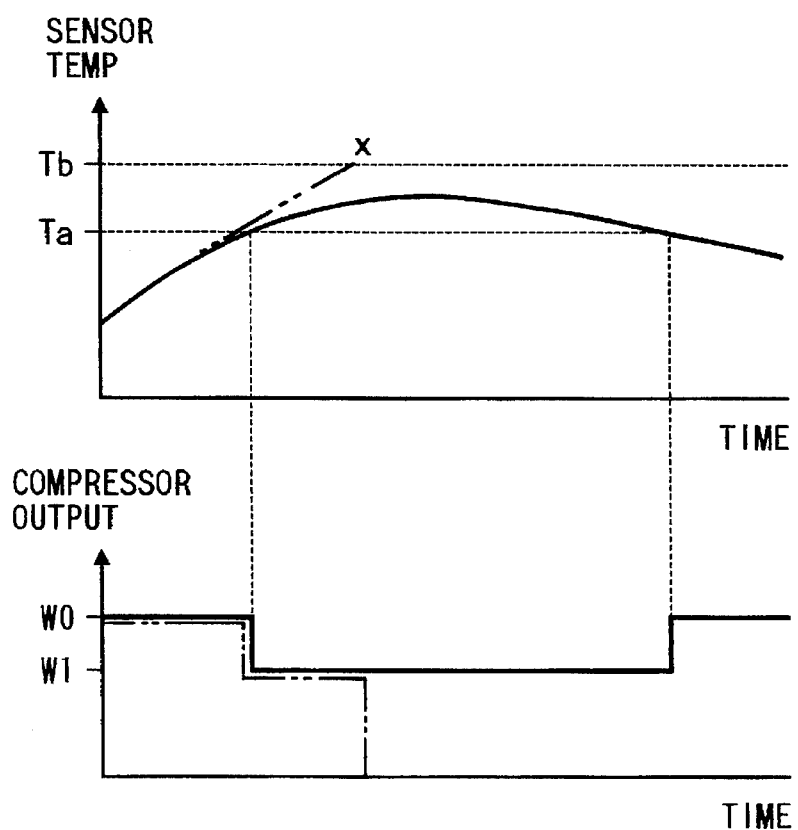
FIG. 5 is a time chart showing an output control of the electric compressor in relation to a detected temperature in accordance with the present invention.

FIG. 5 is a time chart showing a change of compressor output in relation to a detected temperature in accordance with the present invention.

As shown in FIG. 5, the output command W of the compressor 11 is reduced from W0 to W1 when the sensor temperature Ts exceeds the allowable upper-limit temperature Ta. The micro computer 6 maintains the output command W at a constant value W1 for a while unless the sensor temperature Ts exceeds the critical temperature Tb (Steps S4, S5, S7, S9 and S10 of FIG. 4). In the event the sensor temperature Ts accidentally reaches the critical temperature Tb as shown by an alternate long and two dashes line in FIG. 5, micro computer 6 immediately changes the output command W to 0 so as to forcibly stop the compressor 11 (Steps S5 and S6 of FIG. 4).

On the other hand, when the increase of sensor temperature Ts is relatively moderate as shown by a solid line in FIG. 5, micro computer 6 continues to drive compressor 11 at the reduced output W1 until the sensor temperature Ts falls below the allowable upper-limit temperature Ta. Once the sensor temperature Ta falls within the allowable range, micro compressor 6 restores the output command W to the target output W0 so as to drive the compressor 11 in accordance with the user's request, i.e. in direct proportion to the manipulation volume of the knob slidable on the operating section 15 (Steps S1–S5, S7 and S8 of FIG. 4).

Figure 6:
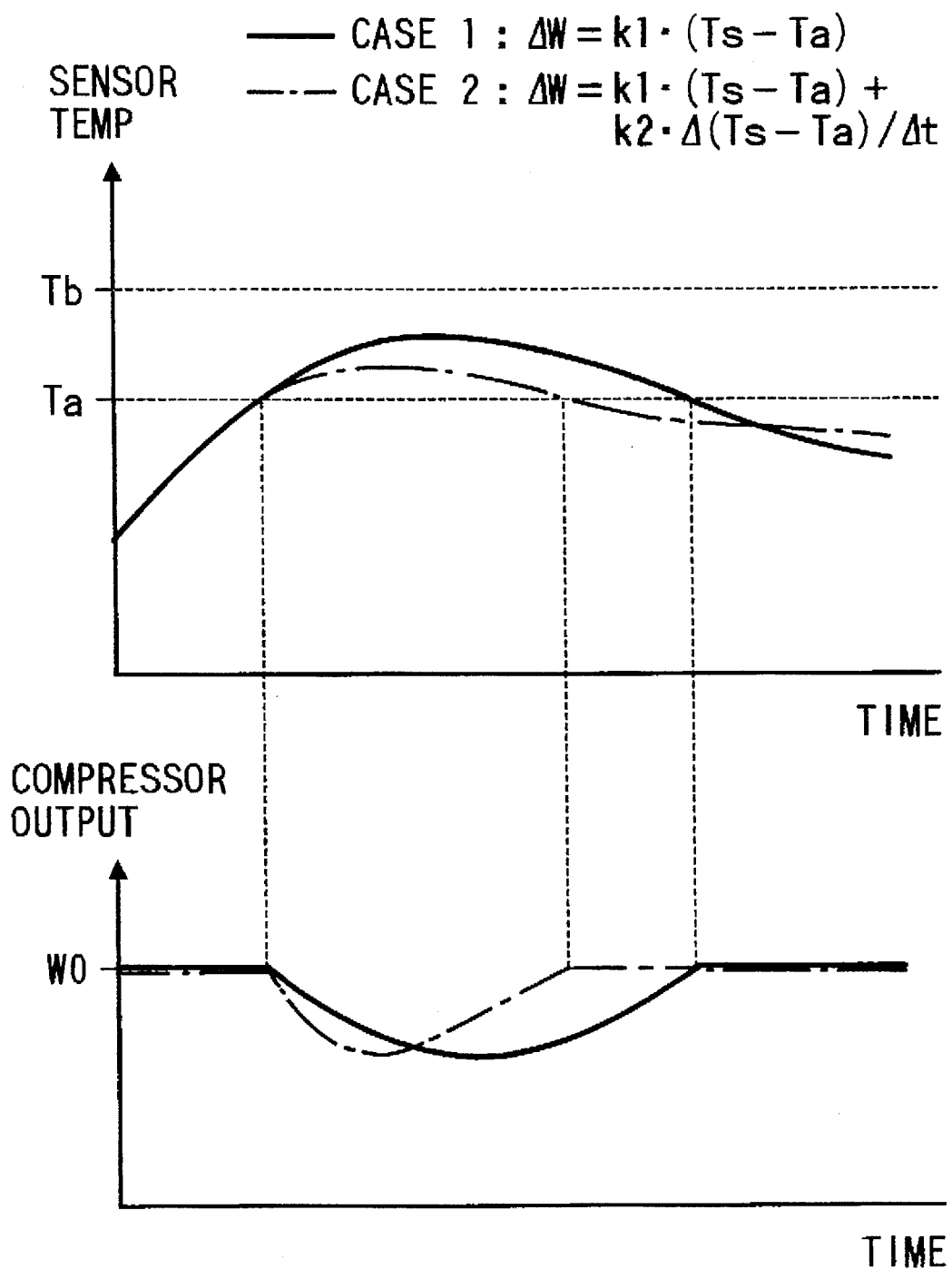
FIG. 6 is a time chart showing another output control of the electric compressor in relation to a detected temperature in accordance with the present invention.

Although FIG. 5 shows the reduction amount $\Delta W$ as a constant value, it is desirable to increase the reduction amount $\Delta W$ in accordance with the difference between sensor temperature Ts and allowable upper-limit Ta, i.e. $\Delta W=k1\cdot(Ts-Ta)$, as shown by a solid line in FIG. 6. Using such setting, it becomes possible to eliminate sudden changes of the compressor output as well as to suppress the overshoot of the sensor temperature Ts.

Furthermore, it is also desirable to increase the reduction amount $\Delta W$ in accordance with the time deviation of the difference between sensor temperature Ts and allowable upper-limit Ta in addition to the difference itself, i.e. $\Delta W=k1\cdot(Ts-Ta)+k2\cdot\Delta(Ts-Ta)/\Delta t$, as shown by an alternate long and dash line in FIG. 6. Using such setting, it becomes possible to further quicken the convergence of sensor temperature Ts.

Next, a modified operation of the present invention will be explained with reference to FIG. 7 which shows another control routine performable by the control system for actuating the compressor in accordance with the present invention.

Figure 4:
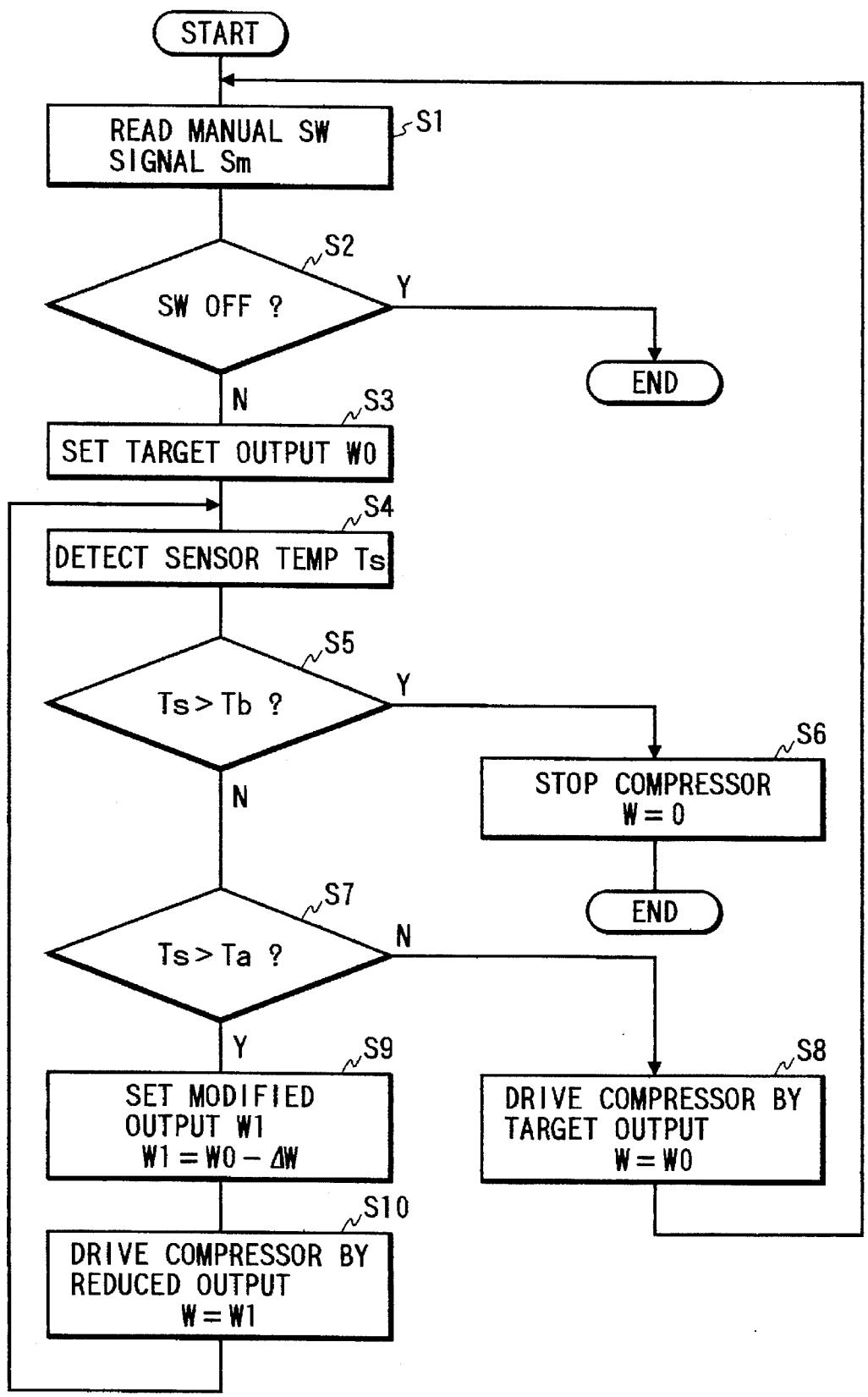
FIG. 4 is a flow chart showing a control routine performed by the control system for actuating the compressor in accordance with the present invention.
Figure 7:
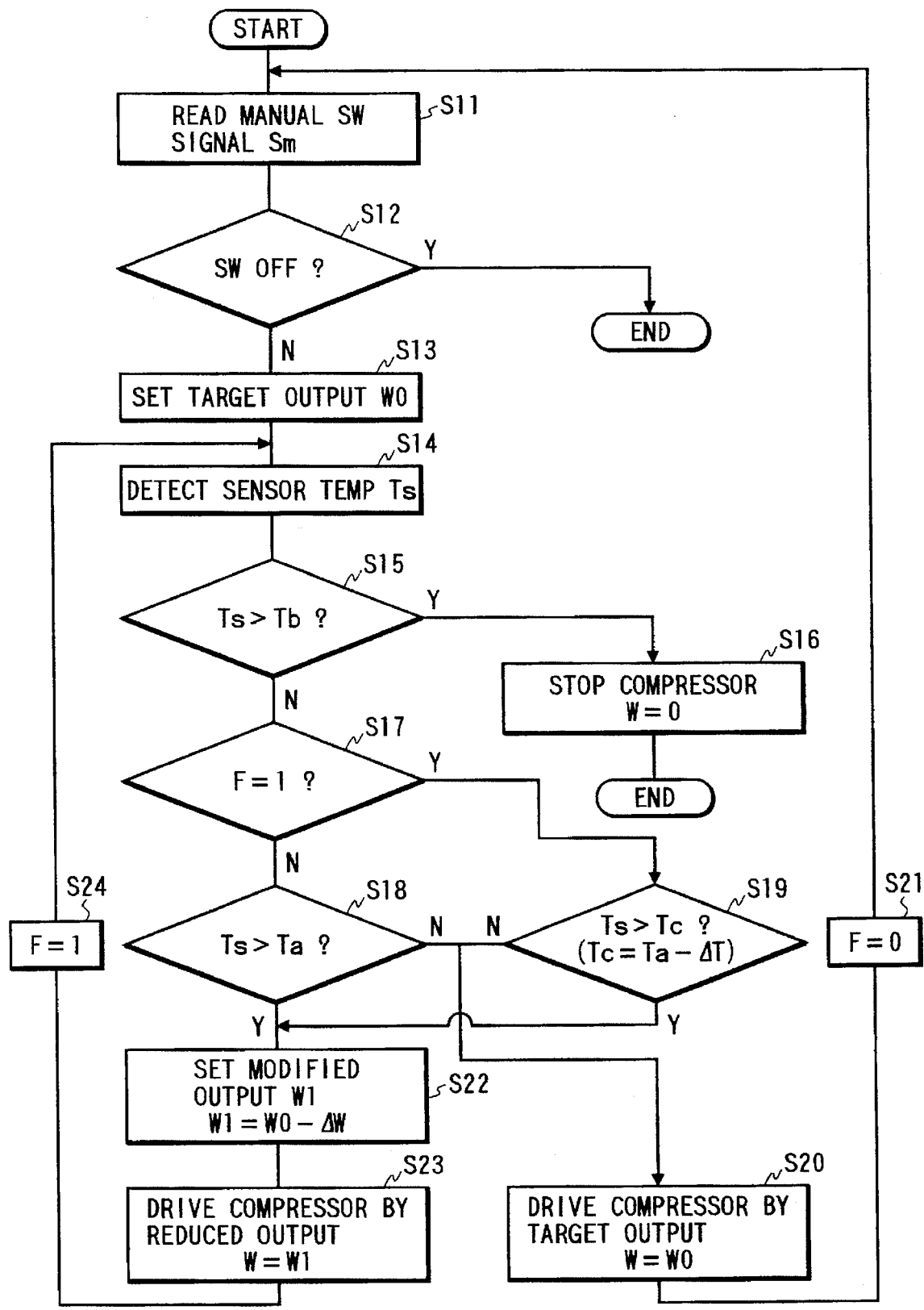
FIG. 7 is a flow chart showing another control routine performed by the control system for actuating the compressor in accordance with the present invention.

The control routine shown in FIG. 7 is different from that of FIG. 4 in that some hysteresis is provided in the setting of allowable range.

More specifically, in step S11, micro computer 6 reads manual switch signal Sm from the operating section 15, the manual switch signal Sm representing the user's request entered through manipulation of the slidable knob provided on the operating section 15.

Next, in step S12, micro computer 6 makes a judgement as to whether the switch knob is in the OFF position. If the judgement is "YES" in step S12, this control routine is ceased at this moment. On the other hand, if the user sets the switch knob somewhere other than the OFF position (i.e. "NO" in step S12), the control routine proceeds to step S13 wherein target output W0 of compressor 11 is determined based on the manipulation volume of the knob slidable on the operating section 15. The target output W0 is proportional to the user's request.

Next, in step S14, micro computer 6 reads sensor temperature Ts detected by temperature sensor 20. Then, it is judged in step S15 whether the sensor temperature Ts is larger than predetermined critical temperature Tb. When the sensor temperature Ts exceeds the critical temperature Tb, the control routine proceeds to step S16 to set the output command W to 0 (W=0) and send this command to the compressor 11, thereby forcibly stopping the compressor 11. The critical temperature Tb is a fairly high temperature that possibly causes the fatal damage unavoidable without shutdown of the electric compressor control system.

When the sensor temperature Ts is not larger than the critical temperature Tb, the control routine proceeds to step S17 to check whether or not a flag F is 1 (i.e. F=1?). This flag F is used to indicate the fact that, when F is 1, compressor 11 undergoes the output reduction control in accordance with the present invention. When the flag F is "0", i.e. "NO" in step S17, the control routine proceeds to step S18. On the contrary, when the flag F is "1", i.e. "YES" in step S17, the control routine proceeds to step S19.

In step S18, micro computer 6 makes a judgement as to whether the sensor temperature Ts is larger than predetermined upper-limit temperature Ta.

When the sensor temperature Ts is not larger than the upper-limit temperature Ta, the control routine proceeds to step S20 to set the output command W to the target output W0 obtained in step S13 (W=W0) and send this command to the compressor 11, thereby driving the compressor 11 in direct proportion to the user's request.

After completing step S20, flag F is set to 0 (i.e. F=0), and the control routine returns to step S11 to repeat the above-described processing.

On the other hand, when the sensor temperature Ts is larger than the upper-limit temperature Ta ("YES" in step S18), micro computer 6 proceeds to step S22 to set a modified output W1 which is smaller than the target output W0 by $\Delta W$, i.e. $W1=W0-\Delta W$ ($>0$). Subsequently, in step S23, micro computer 6 sets the output command W to the modified output W1 (W=W1) and sends this command to the compressor 11, thereby driving the compressor 11 at a slightly smaller output compared with the user's request.

In other words, the sensor temperature Ts is higher than the allowable upper-limit temperature Ta but less than the critical temperature Ta in this case; therefore, the micro computer 6 basically continues to drive compressor 11 although the output command W is set lower than the user's request.

After completing step S23, flag F is set to 1 (i.e. F=1) to indicate that compressor 11 undergoes the output reduction control in accordance with the present invention. Then, the control routine returns to step S14 to repeat the processing of step S14 and below.

Figure 8:
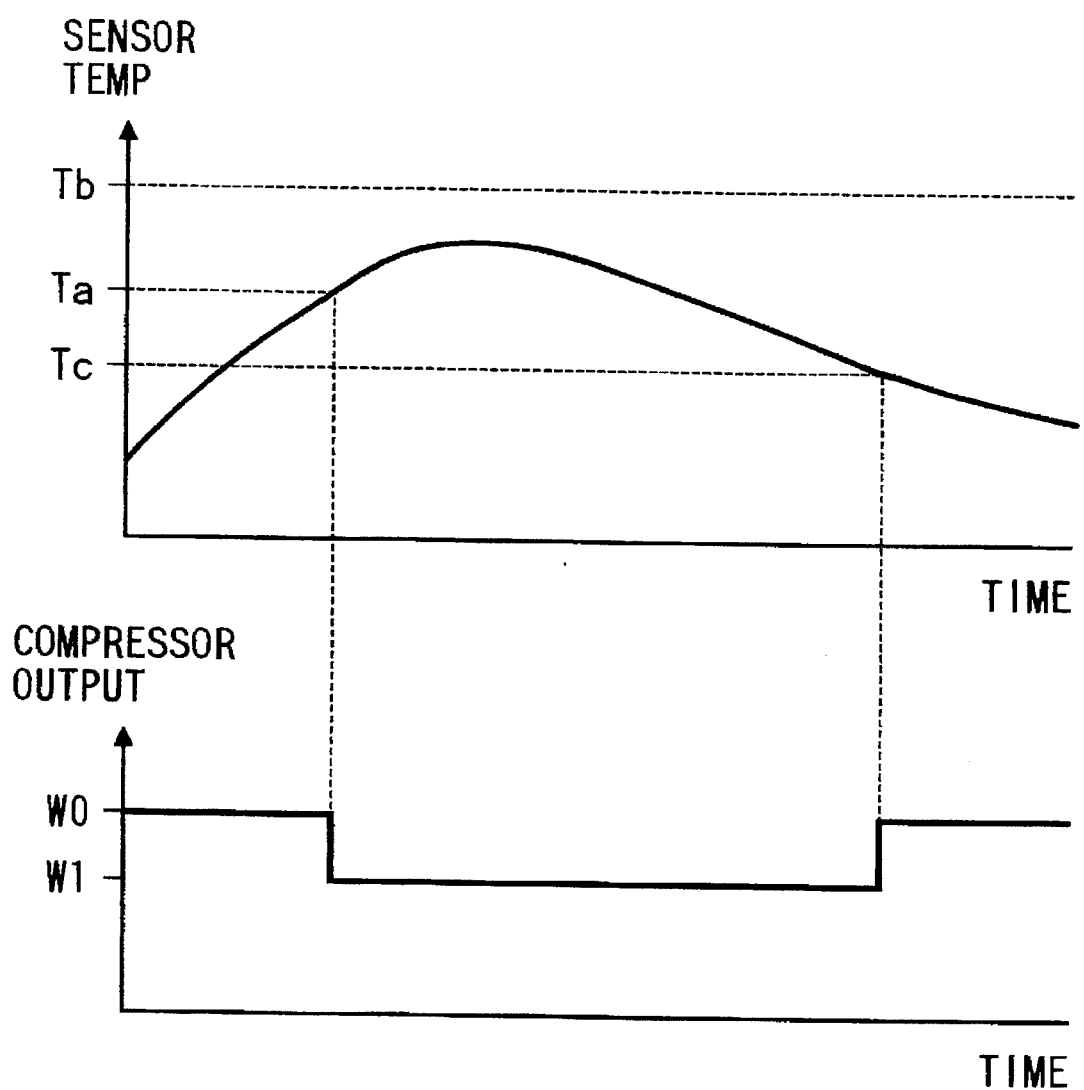
FIG. 8 is a time chart showing an output control of the electric compressor in relation to a detected temperature in accordance with the present invention.

FIG. 8 is a time chart showing a change of compressor output in relation to a detected temperature in accordance with the present invention.

As shown in FIG. 8, the output command W of the compressor 11 is reduced from W0 to W1 when the sensor temperature Ts exceeds the allowable upper-limit temperature Ta. The micro computer 6 maintains the output command W at the reduced value W1 for a while unless the sensor temperature Ts exceeds the critical temperature Tb. In the event the sensor temperature Ts accidentally reaches the critical temperature Tb, micro computer 6 immediately changes the output command W to 0 so as to forcibly stop the compressor 11 (Steps S15 and S16 of FIG. 7).

On the other hand, when the increase of sensor temperature Ts is relatively moderate, micro computer 6 continues to drive compressor 11 at the reduced output W1 until the sensor temperature Ts falls below the temperature Tc. The temperature Tc is set lower than Ta by $\Delta T$. It means that the compressor 11 is continuously driven at the reduced output W1 even the sensor temperature Ts falls below the upper-limit temperature Ta unless it reaches the temperature Tc (Steps S14, S15, S17, S19, S22, S23 and S24 of FIG. 7)

Namely, the difference $\Delta T$ (=Ta-Tc) is a hysteresis set for avoiding the hunting phenomenon in the convergence of sensor temperature Ts.

Once the sensor temperature Ts falls below the temperature Tc, micro computer 6 restores the output command W to the target output W0 so as to drive the compressor 11 in accordance with the user's request, i.e. in direct proportion to the manipulation volume of the knob slidable on the operating section 15 (Steps S19 and S20 of FIG. 7). Then, the flag F is reset to 0, i.e. F=0 (Step S21 of FIG. 7), thereby indicating that the output reduction control of compressor 11 in accordance with the present invention is terminated.

In this manner, the present invention makes it possible to prevent the control unit from being damaged or malfunctioning, and also to prevent an electrically driven compressor from being suddenly stopped except emergency conditions which require the shutdown of the compressor.

Other Embodiments

Figure 9A:
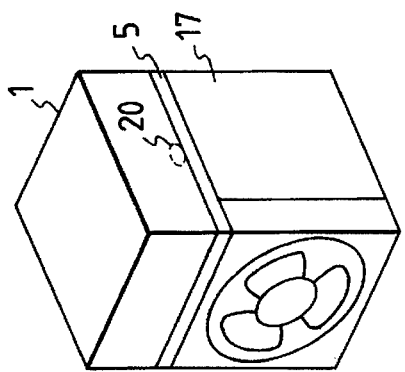
FIGS. 9A through 9C are views showing schematic arrangements of a control system for an electrically driven compressor in accordance with a second embodiment of the present invention.
Figure 9B:
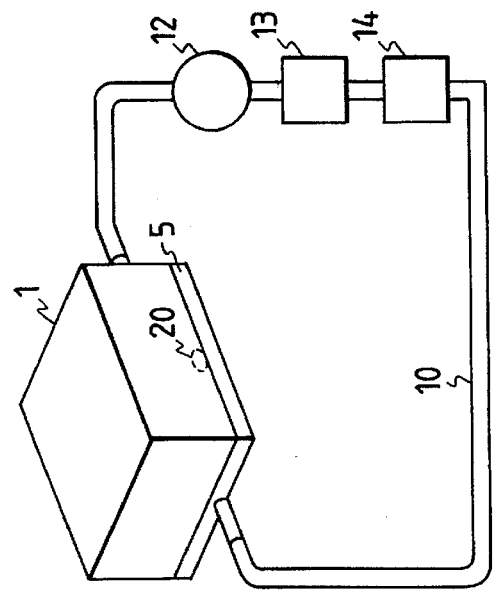
Figure 9C:
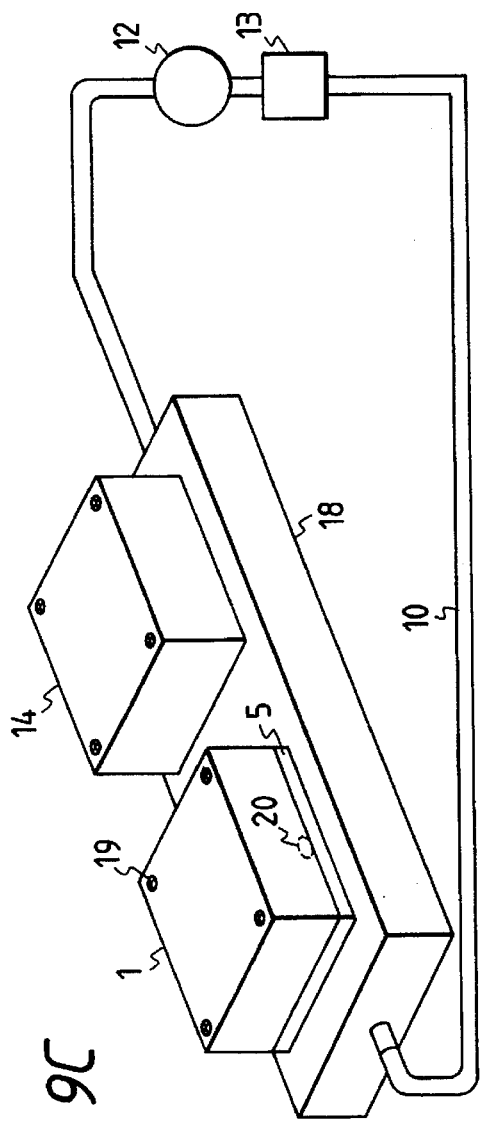

FIGS. 9A through 9C show schematic arrangements of a control system for an electrically driven compressor in accordance with a second embodiment of the present invention. According to the second embodiment of the present invention, the temperature sensor 20 is attached on the heat sink 5 to directly detect the temperature of heat sink 5.

In an embodiment shown in FIG. 9A, heat sink 5 is cooled down by an air-cooling unit 17 with an axial-flow fan. In an embodiment shown in FIG. 9B, heat sink 5 is cooled by water in the same manner as the first embodiment. According to an embodiment shown in FIG. 9C, heat sink 5 is cooled down by a heat sink package 18, where electric compressor control unit 1 is directly mounted on the heat sink package 18 by means of screws 19. The heat sink package 18 is a water-cooling type which mounts the heat generator 14 together with control unit 1.

If the axial-flow fan equipped air-cooling unit 17 or the water cooling unit 13 is out of order, or the connection between the control unit 1 and the heat sink package 18 is not sufficiently tight (for example, due to looseness of screws 19), the cooling ability will be fairly lowered accompanied by an increase of temperature of heat sink 5 which may exceeds the allowable upper-limit (Ta). Receiving the temperature of heat sink 5 from temperature sensor 20, micro computer 6 adjusts the power conversion in the drive power output section 4, i.e. reduces the output command W from W0 to W1 when the sensor temperature Ts exceeds the upper-limit temperature Ta until the sensor temperature Ts falls below within the allowable range.

If the temperature of heat sink 5 exceeds the critical temperature (Tb), micro computer 6 immediately stops the compressor 11 (i.e. W=0) regardless of the knob position of operating section 15.

Figure 10:
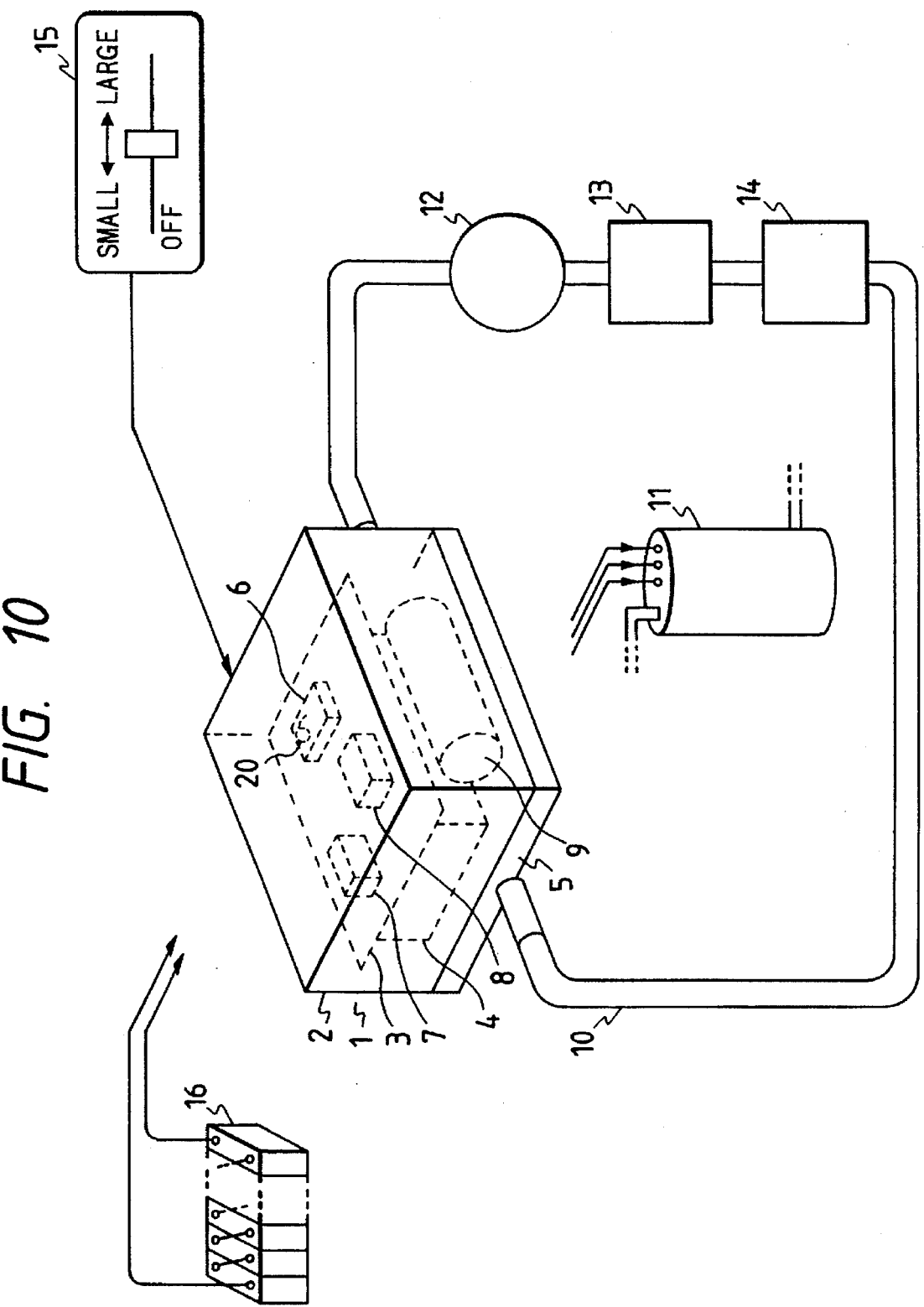
FIG. 10 is an arrangement of a control system for an electrically driven compressor in accordance with a third embodiment of the present invention.

FIG. 10 shows an arrangement of a control system for an electrically driven compressor in accordance with a third embodiment of the present invention. The third embodiment is substantially identical with the first embodiment except that the temperature sensor 20 is directly attached on micro computer 6. The allowable upper-limit temperature of micro computers is approximately 80° C. (i.e. Ta=80° C.).

When the cooling ability is lowered, the temperature of micro computer 6 possibly exceeds 80° C. If the sensor temperature Ts exceeds 80° C., micro computer 6 adjusts the power conversion in the drive power output section 4, i.e. reduces the output command W from W0 to W1 until the sensor temperature Ts falls below within the allowable range less than 80° C.

Figure 11:
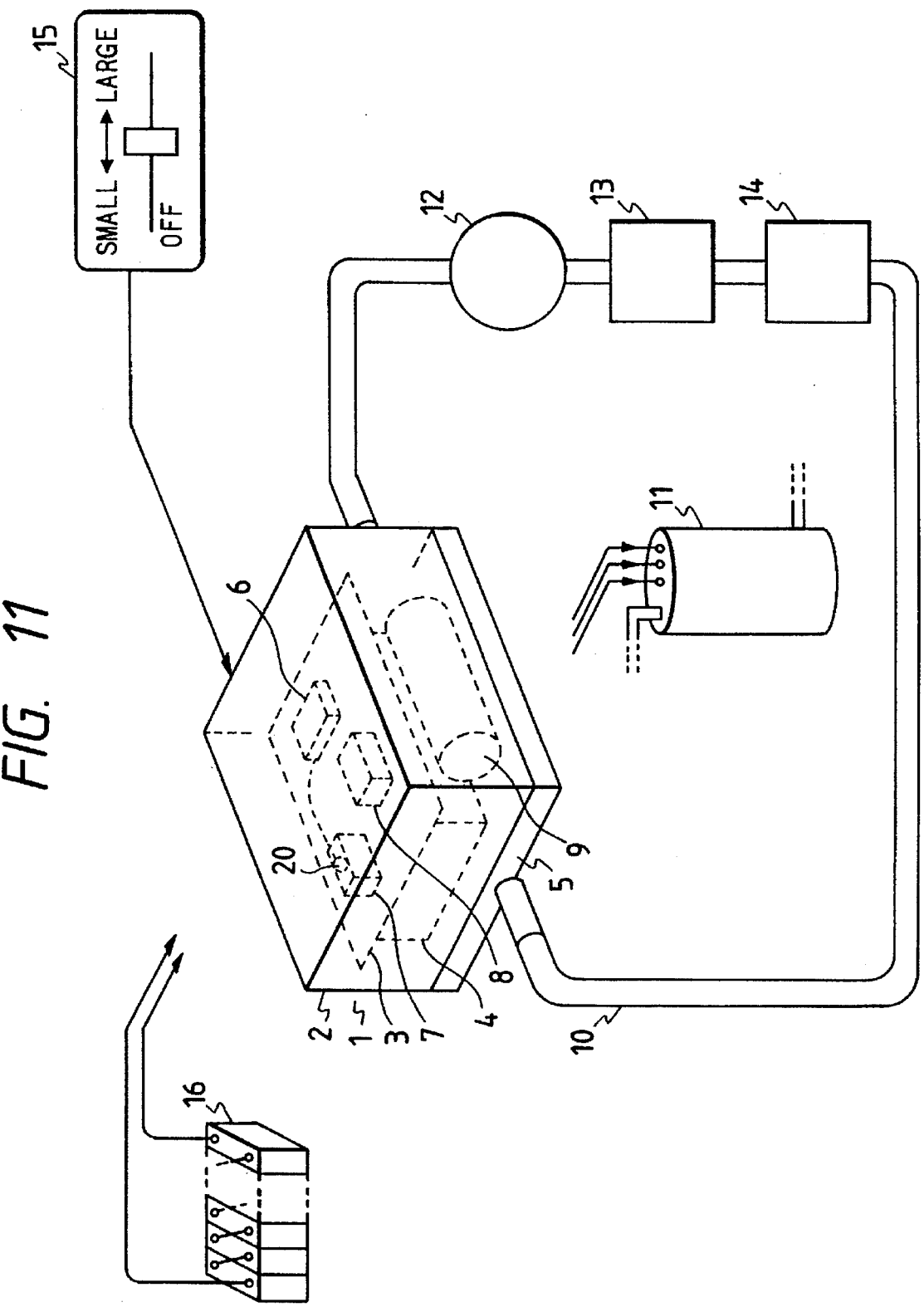
FIG. 11 is an arrangement of a control system for an electrically driven compressor in accordance with a fourth embodiment of the present invention.

FIG. 11 shows an arrangement of a control system for an electrically driven compressor in accordance with a fourth embodiment of the present invention. The fourth embodiment is substantially identical with the first embodiment except that the temperature sensor 20 is directly attached on relay 7. The allowable upper-limit of relays is approximately 80° C. (i.e. Ta=80° C.).

For example, if the heat generation in relay 7 is largely increased due to excessive current, the temperature of relay 7 will exceed 80° C. Upon sensor 20 detecting this excessive increase of temperature, micro computer 6 adjusts the power conversion in the drive power output section 4, i.e. reduces the output command W from W0 to W1 until the sensor temperature Ts falls below within the allowable range less than 80° C.

Figure 12:
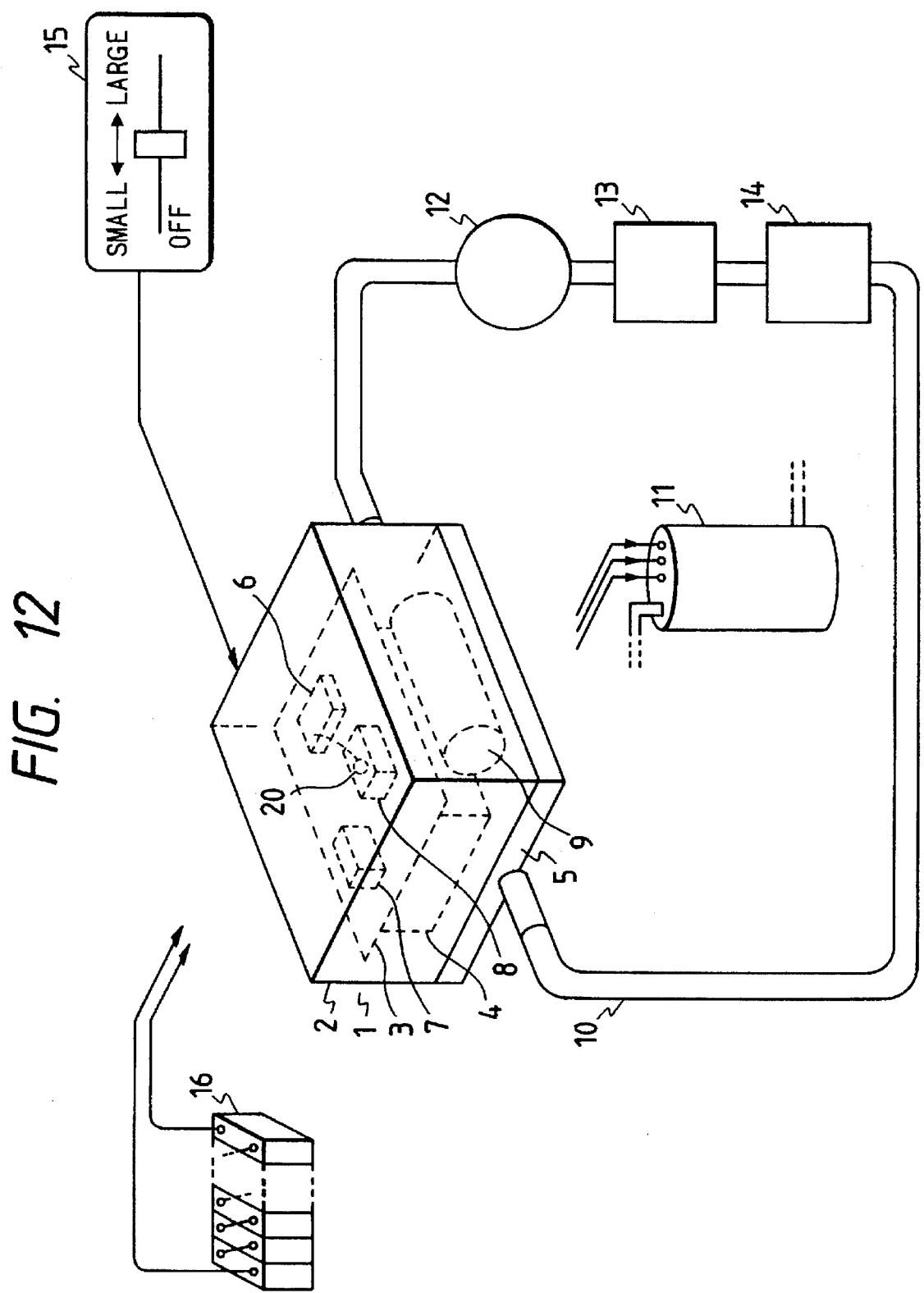
FIG. 12 is an arrangement of a control system for an electrically driven compressor in accordance with a fifth embodiment of the present invention.

FIG. 12 shows an arrangement of a control system for an electrically driven compressor in accordance with a fifth embodiment of the present invention. The fifth embodiment is substantially identical with the first embodiment except that the temperature sensor 20 is directly attached on switching power unit 8. The allowable upper-limit of switching power units is approximately 80° C. (i.e. Ta=80° C.).

When the heat generation in the switching power unit 8 is largely increased due to, for example, an excessive increase of switching loss, the temperature of switching unit 8 possibly exceeds 80° C. Upon sensor 20 detecting this excessive increase of temperature, micro computer 6 adjusts the power conversion in the drive power output section 4, i.e. reduces the output command W from W0 to W1 until the sensor temperature Ts falls below within the allowable range less than 80° C.

Figure 13:
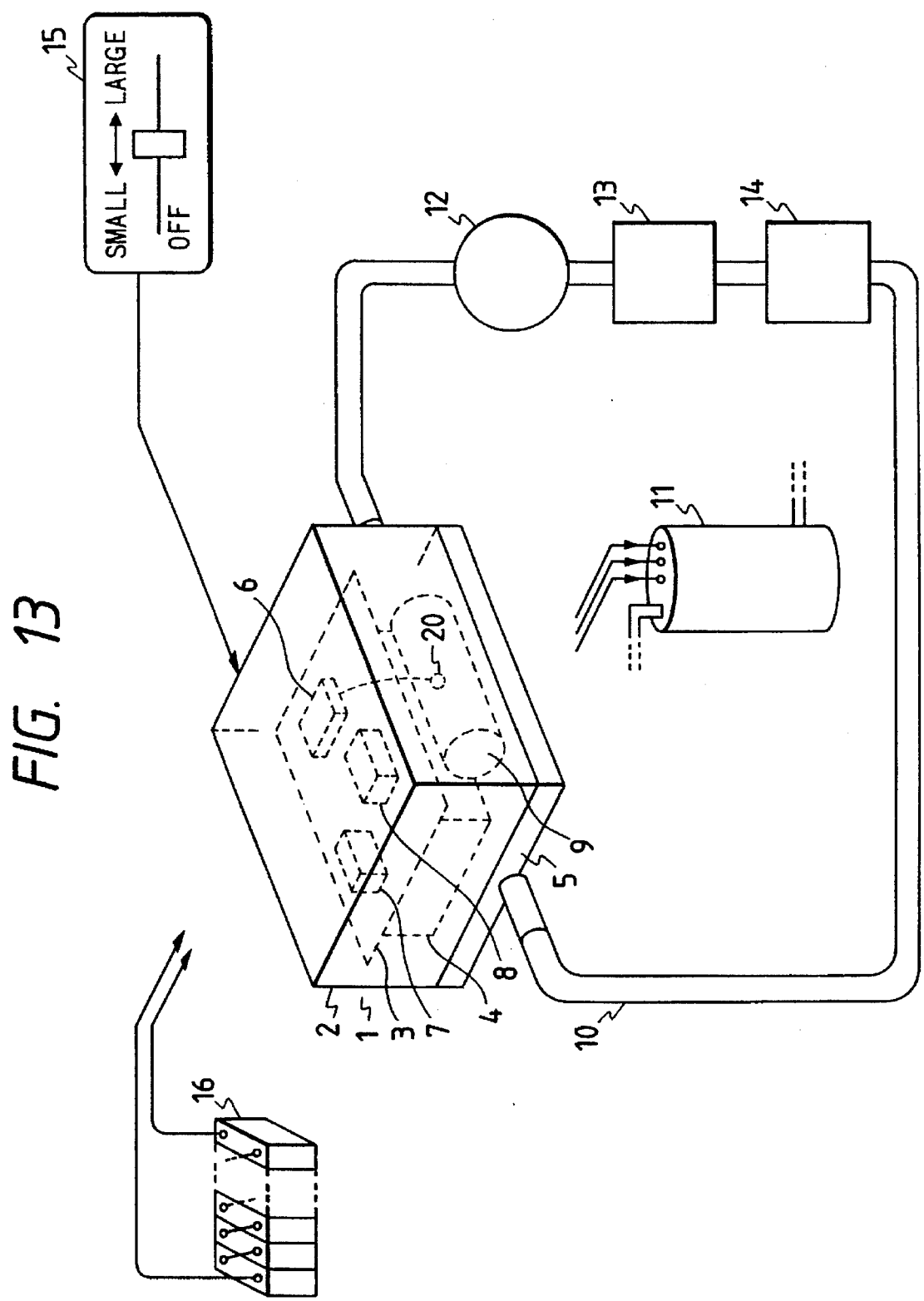
FIG. 13 is an arrangement of a control system for an electrically driven compressor in accordance with a sixth embodiment of the present invention.

FIG. 13 shows an arrangement of a control system for an electrically driven compressor in accordance with a sixth embodiment of the present invention. The sixth embodiment is substantially identical with the first embodiment except that the temperature sensor 20 is directly attached on electrolytic capacitor 9. The allowable upper-limit of electrolytic capacitors is approximately 80° C. (i.e. Ta=80° C.).

When the cooling ability is lowered due to, for example, disorder of pump 12, the temperature of electrolytic capacitor 9 possibly exceeds 80° C. Upon sensor 20 detecting this excessive increase of temperature, micro computer 6 adjusts the power conversion in the drive power output section 4, i.e. reduces the output command W from W0 to W1 until the sensor temperature Ts falls below within the allowable range less than 80° C.

In general, the life of electrolytic capacitors is doubled by reducing the temperature by an amount of 10° C. Hence, the electrolytic capacitor 9, when it has a life of 5,000 hours at 85° C., can extend its life to 10,000 hours by setting the allowable upper-limit temperature (Ta) at 75° C. in this embodiment.

Figure 14:
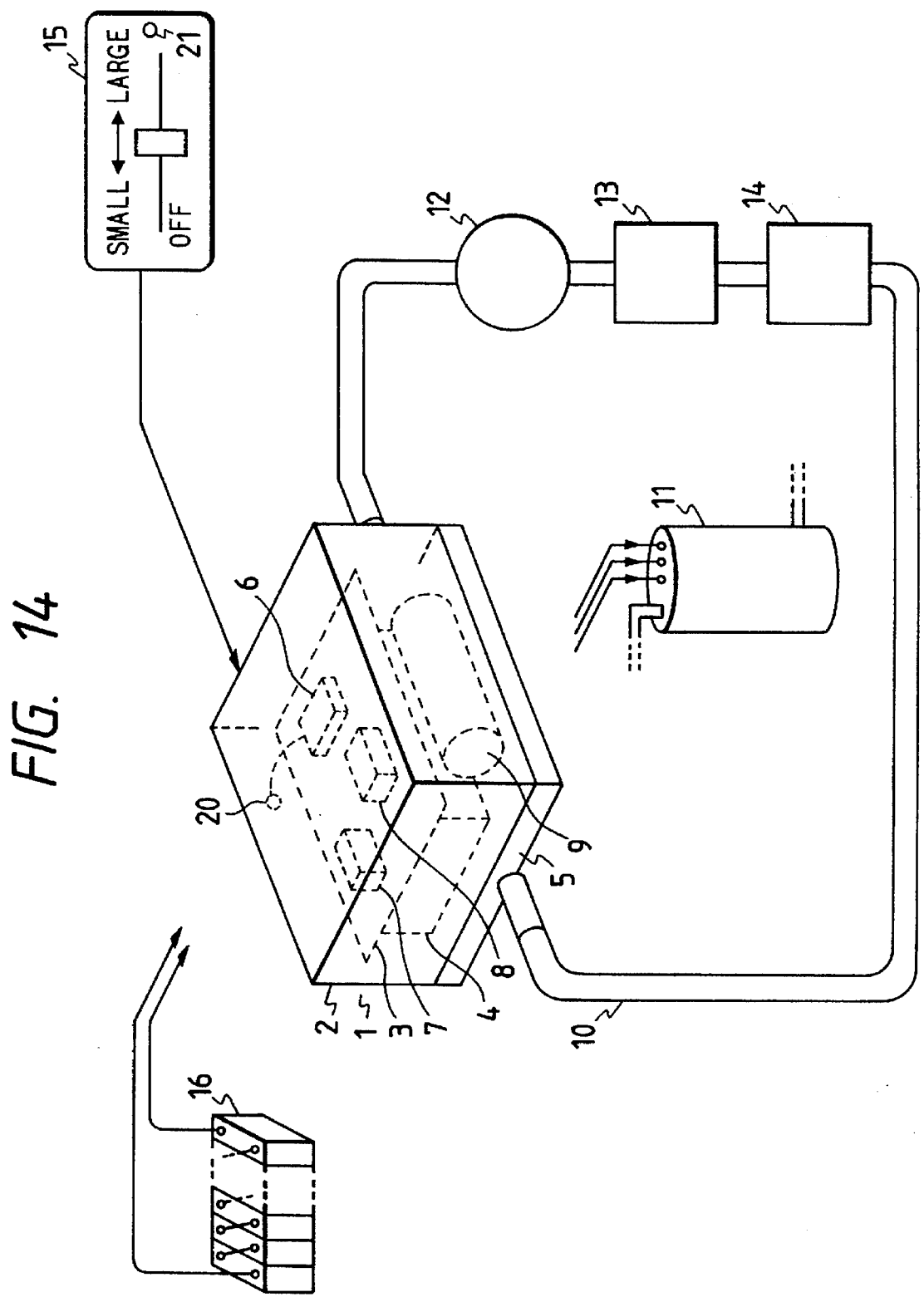
FIG. 14 is an arrangement of a control system for an electrically driven compressor in accordance with a seventh embodiment of the present invention.

FIG. 14 is an arrangement of a control system for an electrically driven compressor in accordance with a seventh embodiment of the present invention. The seventh embodiment is substantially identical with the first embodiment except that an alarm indicator 21 is provided on the operating section 15. According to the seventh embodiment, micro computer 6 sends an alarm signal to operating section 15 as soon as the sensor temperature Ts exceeds the upper-limit temperature (Ta). Upon receiving the alarm signal, the alarm indicator 21 is turned on to inform passengers in a compartment room of an automotive vehicle of the output reduction operation of the compressor.

This invention may be embodied in several forms without departing from the spirit of essential characteristics thereof, the present embodiments as described are therefore intended to be only illustrative and not restrictive, since the scope of the invention is defined by the appended claims rather than by the description preceding them, and all changes that fall within metes and bounds of the claims, or equivalents of such metes and bounds, are therefore intended to be embraced by the claims.

What is claimed is:

1. A control apparatus for actuating an electrically driven compressor equipped in an automotive vehicle, comprising:

a temperature sensor generating a signal representing a temperature of a component in the control apparatus; and control means connected to said temperature sensor for adjusting an output command supplied to said electrically driven compressor in accordance with said signal generated from said temperature sensor.

2. The compressor control apparatus defined by claim 1, wherein said temperature sensor detects a temperature of a heat radiator provided in said control apparatus.

3. The compressor control apparatus defined by claim 1, wherein said temperature sensor detects a temperature of a micro computer provided in said control apparatus.

4. The compressor control apparatus defined by claim 1, wherein said temperature sensor detects a temperature of a relay provided in said control apparatus.

5. The compressor control apparatus defined by claim 1, wherein said temperature sensor detects a temperature of a power unit provided in said control apparatus.

6. The compressor control apparatus defined by claim 1, wherein said temperature sensor detects a temperature of an electrolytic capacitor provided in said control apparatus.

7. The compressor control apparatus defined by claim 1, further comprising an alarm indicator generating an alarm whenever the temperature detected by said temperature sensor goes out of a predetermined allowable range.

8. A control apparatus for actuating an electrically driven compressor equipped in an automotive vehicle, comprising:

manual switch means for allowing a use to adjust an output of said compressor and generating a request signal representing a quantity of user's manual adjustment;

command generating means for receiving said request signal and generating an output command supplied to said compressor in accordance with said quantity of manual adjustment;

drive means for actuating said compressor based on said output command;

temperature sensing means for generating a temperature signal representing a temperature of a component in the control apparatus; and adjusting means for receiving said temperature signal from said temperature sensing means and generating a modified output command when said temperature detected by said temperature sensing means exceeds a predetermined upper-limit value, said modified output command being smaller than said output command but larger than 0.

9. A control apparatus for actuating an electrically driven compressor equipped in an automotive vehicle, comprising:

manual switch means for allowing a use to adjust an output of said compressor and generating a request signal representing a quantity of user's manual adjustment;

target output means for receiving said request signal from said manual switch means and obtaining a target output of said compressor, said target output being proportional to said quantity of user's manual adjustment;

temperature sensing means for generating a temperature signal representing a temperature of a component in the control apparatus;

modified output means for receiving said temperature signal from said temperature sensing means and obtaining a modified output when said temperature detected by said temperature sensing means exceeds a predetermined upper limit, said modified output being smaller than said target output obtained by said target output means but larger than 0;

command generating means for generating an output command supplied to said compressor in such a manner that said output command is equalized to said target output when said temperature detected by said temperature sensing means is within a predetermined allowable range while said output command is equalized to said modified output when said temperature detected by said temperature sensing means exceeds said upper limit; and drive means for actuating said compressor based on said output command generated from said command generating means.

10. A control apparatus for actuating an electrically driven compressor equipped in an automotive vehicle, comprising:

manual switch means for allowing a use to adjust an output of said compressor and generating a request signal representing a quantity of user's manual adjustment;

target output means for receiving said request signal from said manual switch means and obtaining a target output of said compressor, said target output being proportional to said quantity of user's manual adjustment;

temperature sensing means for generating a temperature signal representing a temperature of a component in the control apparatus;

modified output means for receiving said temperature signal from said temperature sensing means and obtaining a modified output when said temperature detected by said temperature sensing means exceeds a predetermined upper limit, said modified output being smaller than said target output obtained by said target output means but larger than 0;

emergency means for receiving said temperature signal from said temperature sensing means and forcibly stopping said compressor when said temperature detected by said temperature sensing means exceeds a predetermined critical value higher than said upper limit;

command generating means for generating an output command supplied to said compressor in such a manner that said output command is equalized to said target output when said temperature detected by said temperature sensing means is within a predetermined allowable range while said output command is equalized to said modified output when said temperature detected by said temperature sensing means is higher than said upper limit but lower than said critical value; and drive means for actuating said compressor based on said output command generated from said command generating means.

11. A control method for actuating an electrically driven compressor equipped in an automotive vehicle, comprising the steps of:

reading a request signal representing a quantity of user's manual adjustment;

setting a target output of said compressor based on said request signal;

detecting a temperature of a component in the control apparatus;

judging whether said temperature is larger than a predetermined upper limit;

obtaining an output command in such a manner that said output command is equalized to said target output when said temperature is within a predetermined allowable range while said output command is reduced to a modified value larger than 0 when said temperature exceeds said upper limit; and actuating said compressor based on said output command.

12. A control method for actuating an electrically driven compressor equipped in an automotive vehicle, comprising the steps of:

reading a request signal representing a quantity of user's manual adjustment;

setting a target output of said compressor based on said request signal, said target output being proportional to said quantity of user's manual adjustment;

detecting a temperature of a component in the control apparatus;

judging whether said temperature is larger than a predetermined upper limit;

generating an output command equalized to said target output when said temperature is within a predetermined allowable range;

setting a modified output by reducing said target output by a predetermined correction value, said modified output being smaller than said target output but larger than 0;

generating an output command equalized to said modified output when said temperature exceeds said upper limit; and actuating said compressor based on said output command.

13. A control method for actuating an electrically driven compressor equipped in an automotive vehicle, comprising the steps of:

reading a request signal representing a quantity of user's manual adjustment;

setting a target output of said compressor based on said request signal, said target output being proportional to said quantity of user's manual adjustment;

detecting a temperature of a component in the control apparatus;

judging whether said temperature is larger than a predetermined critical value;

stopping said compressor when said temperature exceeds said critical value, regardless of said quantity of user's manual adjustment;

judging whether said temperature is larger than a predetermined upper limit, said upper limit being lower than said critical value;

generating an output command equalized to said target output when said temperature is within a predetermined allowable range;

setting a modified output by reducing said target output by a predetermined correction value, said modified output being smaller than said target output but larger than 0;

generating an output command equalized to said modified output when said temperature is higher than said upper limit but lower than said critical value; and actuating said compressor based on said output command.

14. The compressor control method defined by claim 13, further comprising the steps of:

judging whether said temperature is larger than a predetermined reference value, said reference value being lower than said upper limit; and restoring said output command to said target output when said temperature falls below said reference value.

* * * * *